(12) United States Patent
Zheng et al.

(10) Patent No.: US 10,568,304 B2
(45) Date of Patent: Feb. 25, 2020

(54) STEEL STRUCTURE CAGE FOR MARINE CRUSTACEAN AQUACULTURE AND INTEGRATION THEREOF INTO VERTICAL FISH-CRUSTACEAN AQUACULTURE SYSTEM

(71) Applicant: Graduate School at Shenzhen, Tsinghua University, Shenzhen, Guangdong (CN)

(72) Inventors: Xiangyuan Zheng, Guangdong (CN); Yu Lei, Guangdong (CN); Daoyi Chen, Guangdong (CN); Yi Li, Guangdong (CN)

(73) Assignee: Graduate School at Shenzhen, Tsinghua University, Shenzhen (CN)

( * ) Notice: Subject to any disclaimer, the term of this patent is extended or adjusted under 35 U.S.C. 154(b) by 231 days.

(21) Appl. No.: 15/852,582

(22) Filed: Dec. 22, 2017

(65) Prior Publication Data
US 2018/0139935 A1 May 24, 2018

Related U.S. Application Data

(63) Continuation of application No. PCT/CN2016/109531, filed on Dec. 12, 2016.

(30) Foreign Application Priority Data

Nov. 23, 2016 (CN) .......................... 2016 1 1038112

(51) Int. Cl.
*A01K 63/00* (2017.01)
*A01K 69/10* (2006.01)
(Continued)

(52) U.S. Cl.
CPC .............. *A01K 63/00* (2013.01); *A01K 61/60* (2017.01); *A01K 61/65* (2017.01); *A01K 69/10* (2013.01);
(Continued)

(58) Field of Classification Search
USPC ........ 119/223, 200, 215, 234, 239, 204–211; 43/100, 105
See application file for complete search history.

(56) References Cited

U.S. PATENT DOCUMENTS 3,786,593 A * 1/1974 Gerbrandt .............. A01K 69/08
  43/100
4,716,854 A * 1/1988 Bourdon ................ A01K 61/60
  119/223
(Continued)

FOREIGN PATENT DOCUMENTS

CN 101223868 A 7/2008
CN 102792906 A 11/2012
(Continued)

*Primary Examiner* — Andrea M Valenti
(74) *Attorney, Agent, or Firm* — Hamre, Schumann, Mueller & Larson, P.C.

(57) ABSTRACT

A steel structure cage for marine crustacean aquaculture and integration thereof into a vertical fish-crustacean aquaculture system are disclosed. The steel structure cage includes a steel frame, top, side and bottom net systems, a ballast tank system, and steel grooves. The steel frame includes internal and external steel frames. The steel grooves are fixed on upper and lower ends of the internal steel frame. Edges of the top and bottom net systems are respectively fixed into the corresponding steel grooves. The side net is welded on the internal steel frame. The ballast tank system is arranged between the internal and external steel frames. A HDPE cage is moored to the steel structure cage to form a vertical aquaculture system. Whereby, an ideal culturing environment for marine crustaceans is given and the objective of vertical aquaculture "culturing fish at top water layers and culturing prawns (crabs or cowries) at bottom water layers" can be fulfilled.

9 Claims, 4 Drawing Sheets

(51) Int. Cl.
   *A01K 61/60* (2017.01)
   *A01K 61/65* (2017.01)
   *A01K 61/10* (2017.01)
   *A01K 61/80* (2017.01)

(52) U.S. Cl.
   CPC .............. *A01K 61/10* (2017.01); *A01K 61/80* (2017.01); *Y02A 40/826* (2018.01); *Y02A 40/828* (2018.01)

(56) References Cited

U.S. PATENT DOCUMENTS

| | | | | |
|---|---|---|---|---|
| 5,007,376 A | * | 4/1991 | Loverich | A01K 73/12 119/223 |
| 5,325,625 A | * | 7/1994 | Liu | A01M 1/02 43/111 |
| 5,329,719 A | * | 7/1994 | Holyoak | A01K 61/60 43/6.5 |
| 6,386,146 B1 | * | 5/2002 | Knott, Sr. | A01K 61/60 119/223 |
| 7,313,887 B2 | * | 1/2008 | Hibbs | A01K 69/10 43/100 |
| 8,171,886 B2 | * | 5/2012 | Oishi | B22D 21/025 119/223 |
| 2006/0288634 A1 | * | 12/2006 | Wimbus | A01K 69/10 43/105 |
| 2008/0029040 A1 | * | 2/2008 | Quinta Cortinas | A01K 61/54 119/208 |
| 2008/0110408 A1 | | 5/2008 | Thorvardarson et al. | |
| 2010/0018470 A1 | * | 1/2010 | Kim | A01K 61/60 119/223 |
| 2010/0050952 A1 | * | 3/2010 | Stillman | A01K 61/60 119/223 |
| 2010/0058991 A1 | * | 3/2010 | Dobson | A01K 61/60 119/223 |
| 2013/0186345 A1 | * | 7/2013 | Leslie | A01K 61/54 119/240 |

FOREIGN PATENT DOCUMENTS

| | | | | |
|---|---|---|---|---|
| CN | 203912942 | * | 1/2014 | ............. A01K 61/00 |
| CN | 203563538 U | | 4/2014 | |
| CN | 104273068 A | | 1/2015 | |
| CN | 205093370 U | | 3/2016 | |
| CN | 105994065 A | | 10/2016 | |
| CN | 206227372 U | | 6/2017 | |

* cited by examiner

STEEL STRUCTURE CAGE FOR MARINE CRUSTACEAN AQUACULTURE AND INTEGRATION THEREOF INTO VERTICAL FISH-CRUSTACEAN AQUACULTURE SYSTEM

CROSS REFERENCE TO RELATED APPLICATION

This application is a continuation application of PCT/CN2016/109531, filed on Dec. 12, 2016. The contents of PCT/CN2016/109531 are all hereby incorporated by reference.

BACKGROUND

Field

The present application relates to a cage in the field of marine aquaculture, and in particular, to a steel structure cage for marine crustacean aquaculture and integration thereof into a vertical fish-crustacean aquaculture system.

Related Arts

At present, as people's living standard is improved continuously, more and more delicious and nutritious marine products become an important source of nutrition. Many marine crustaceans such as prawns, cowries, and crabs, are eatable and have relatively high nutritional values, which are popular among consumers and have a broad market. However, the production of the crustacean seafood occupies only a small portion of the marine fisheries, and most crustacean seafood is obtained by marine fishing and only a small part of the crustacean seafood is produced from ocean farming. Besides, the current culturing style of the marine crustaceans is violating the sustainable development.

Taking prawns culturing as an example, prawns culturing in China still heavily depends on the conventional pond culturing manner which is also widely used by countries like Vietnam and India. Disadvantages of using prawn ponds are: it is difficult to control the water quality; construction of the ponds destroys a large quantity of farmlands and mangrove forests; large-scale use of drugs makes prawns grow in unhealthy environments and results in poor-quality prawns and serious pollution. All of these are harmful to the development of this industry.

In recent years, the cage farming industry has developed rapidly along China's coastal areas. A gravity-type high density polyethylene (HDPE) floating cage introduced from Europe is being widely used, and culturing fish with such cages has gained great economic benefits. Offshore cage farming has become a main stream of seafood aquaculture. However, so far large-scale cage aquaculture of crustacean seafood such as prawns and crabs at sea has not yet been realized and reported. The main reason is that the living habits and growing environments of crustacean creatures greatly diff from those of fish. At present, the widely used gravity-type HDPE cage for fish culture is not suitable for culturing the crustacean seafood. Taking prawns as an example, they are benthic species, having a poor capability to resist wind and waves. Therefore, a sheltering habitat needs to be provided for prawns during every culturing stage. However, the soft and suspended net of the gravity-type HDPE cage in water has to experience a large deformation under wave and sea current actions. The cage fails to provide a safe and stable benthic space for crustaceans.

Several concepts therefore have been proposed to deal with this matter. For example, a Chinese utility model patent entitled "PRAWNS AQUACULTURE CAGE" (Application No. CN201520831245.9) discloses a prawns aquaculture cage in which the bottom is a sand plate. The cage is only applicable to water areas such as lakes, shallow sea, or estuaries. For the open sea with strong wind and waves, such type of cage tends to move violently with waves and current. Thus the sand leaves the plate easily. Meanwhile, the deformed net damages prawn's skin and greatly reduces their survival rate.

In addition, the widely used gravity-type HDPE cage also has the following limitations. The cage depends on heavy objects hanging at the bottom of the net to provide tension, so as to keep a constant shape of the net under waves and current. Nevertheless, this gravitational system brings difficulties to the net replacement. If the weight of hanging objects is small, the net replacement can be done with ease, but this may cause the net during culturing period to have large deformations and as a result the culturing volume is greatly decreased. For the mooring system using anchors, anchoring quality is important but it has been reported that poor anchoring has been the main cause to account for both large displacement of cages and broken nets. The consequence includes fish escaping, leading to economic losses of fishery and ecological destruction of ocean. To summarize, it is still necessary to further improve the design of aquaculture cages.

SUMMARY

The present application provides a steel structure cage for marine crustacean aquaculture and integration thereof into a vertical fish-crustacean aquaculture system.

A steel structure cage for marine crustacean aquaculture includes a top net system, a bottom net system, a side net system, a ballast tank system, a steel frame, and steel grooves, where the steel frame includes an internal steel frame and an external steel frame, and the steel grooves are fixed on upper and lower ends of the internal steel frame; the top net system and the bottom net system are weaved by nets and net tendons, edges of the top net system and the bottom net system are fixed into the corresponding steel grooves; the side net system is a steel net system and is welded on the internal steel frame; the ballast tank system is arranged between the internal steel frame and the external steel frame; and the bottom net system lies onto the seabed during culturing. When the ballast tank system is filled with only air, the entire cage can float in water with buoyancy; when the ballast tank system is filled with water, the entire cage gradually sinks to the seabed under the gravitational force. Therefore, rising and sinking of the entire cage in sea water is controlled by the ballast tank system.

In an embodiment, the top net system is made of either nylon or polyethylene.

In an embodiment, the bottom net system is made of either nylon or polyethylene.

In an embodiment, both the internal steel frame and the external steel frame include columns, a baffle is welded on the bottom of each of the columns of the internal and external steel frames, a conical structure is welded on the baffle, and the area of the baffle is greater than the cross-sectional area of the column.

The diameter of the column is relatively small, and when there is soft soil such as sludge at the seabed, the columns will sink into the soil. After the circular baffle is welded on the column, the contact area between the column and the seabed is increased. As a result, sinking of the columns stops, ensuring that the cage sits on the surface of seabed rather than deeply penetrates the soil. The conical structure can penetrate the sediment of seabed for a certain depth, so that the lateral resistance is increased and the lateral movement of the cage is prevented.

In an embodiment, both the internal steel frame and the external steel frame include columns, and the columns of the external steel frame are higher than those of the internal steel frame.

In an embodiment, the steel structure cage further includes lifting lugs, where the lifting lugs are fixed on the top of the columns of the internal steel frame.

In an embodiment, the steel structure cage further includes a feeding pipe, where one end of the feeding pipe is connected to a buoy and freely floats on the water surface, and the other end of the feeding pipe is placed inside the cage though the center of the top net system.

In an embodiment, the top net system is fastened with floaters and the bottom net system is fastened with heavy sinkers.

The top net system and/or the bottom net system is made of either nylon or polyethylene. The densities of nylon and polyethylene are close to seawater density. When the steel structure cage sits on the seabed, the top net system and the bottom net system tend to swing upward and downward with the flow of water. This can affect the growth of crustaceans in the cage. Therefore, the floaters fastened on the top net system will always pull the entire top net system in a tensioning state, while the sinkers fastened on the bottom net system will make the bottom net system always cling to the seabed. The above measures will ensure a safe and stable benthic environment for crustaceans.

In an embodiment, the ballast tank system consists of multiple HDPE pipes. The pipes do not communicate with each other and serve as independent cabins. A rubber capsule that resists seawater corrosion is placed in each HDPE pipe and a nozzle is installed on the wall of the rubber capsule. An air-duct with an inlet valve and an outlet valve is connected to the nozzle, and the other end of the air-duct is connected to a buoy floating on the water surface. An air inlet and an air outlet, and a water inlet and a water outlet are formed on each HDPE pipe. The volume of inside seawater in each HDPE pipe is adjusted by filling and expelling air in the rubber capsule so as to control rising and sinking of the steel structure cage in water. The HDPE pipes are fixed at the bottom of the steel frame by hoops. The inner diameter of the hoop is slightly greater than the outer diameter of the HDPE pipe, and the hoop is large and strong enough to secure the HDPE pipes at the connecting position.

The present application further provides a vertical fish-crustacean aquaculture system, including a HDPE (circular) cage, mooring lines, cables, and the steel structure cage for marine crustacean aquaculture described above, where during culturing, the HDPE (circular) cage floats on the water surface, the steel structure cage for marine crustacean aquaculture sits on seabed, the HDPE (circular) cage is moored to the steel structure cage for marine crustacean aquaculture by the mooring lines, and a net system of the HDPE (circular) cage is connected to the steel structure cage for marine crustacean aquaculture by the cables to maintain the shape of the net system of the HDPE (circular) cage.

In an embodiment, both the internal steel frame and the external steel frame include columns, and the columns of the external steel frame are higher than those of the internal steel frame, so that during an offshore towing process, the steel structure cage for marine crustacean aquaculture floats on the sea, and supports the HDPE (circular) cage which is located inside the external steel frame.

The columns of the external steel frame are higher than the columns of the internal steel frame to ensure that HDPE (circular) cage not slip off the steel structure cage when towed at sea.

Beneficial effects of the present application include:

In the present application, inside the space of the steel structure cage for marine crustacean aquaculture, the bottom net system of the cage lies onto the seabed and crustaceans can move freely on the seabed; the cage has high stiffness and does not deform; during culturing, the cage sits on the seabed and is hardly affected by current and waves, which effectively enhances the survivability of the cage in severe weather like, typhoon. The aforementioned culturing conditions provide an ideal growing environment for crustaceans.

The vertical fish-crustacean aquaculture system integrated by the steel structure cage for marine crustacean aquaculture and the HDPE (circular) cage makes full use of their respective features, and meanwhile takes full advantage of water resources. The system can realize vertical culturing in the vertical direction. During culturing, the HDPE (circular) cage floating on the sea is moored by mooring lines and can move with waves to some extent. The shape of the net system of the HDPE cage is maintained by the steel structure cage for marine crustacean aquaculture which resolves the problem in changing the net system of the gravity-type HDPE (circular) cage. In addition, the net of the HDPE (circular) cage has small deformations, which ensures enough culturing space for fish. Using the steel structure cage for marine crustacean aquaculture as the anchoring system for mooring lines and as the securing system for cables and the net system of the HDPE (circular) cage reduces the costs of the whole vertical fish-crustacean aquaculture system. In addition, the excrement and the remaining baits of fish in the HDPE (circular) cage may fall into the steel structure cage for marine crustacean aquaculture and serve as a source of food for crustaceans. These will reduce the feeding quantity of baits for crustaceans and the pollution to the ambient environment.

In the present application, the objective of vertical fish-crustacean aquaculture in different water layers, for example, "culturing fish at top water layers and culturing prawns (crabs or cowries) at bottom water layers", is achieved. The present application has remarkable environment benefits and economic benefits, and is suitable for the requirements of aquaculture development in coastal water, especially for water depth of 20-50 meters.

BRIEF DESCRIPTION

DETAILED DESCRIPTION

Figure 1:
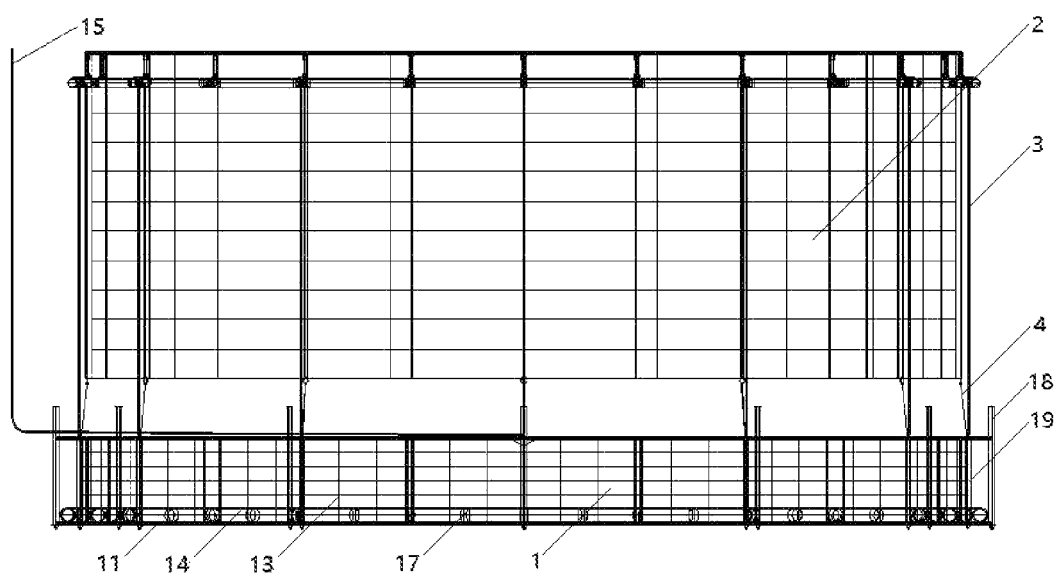
FIG. 1 is a front view of a vertical fish-crustacean aquaculture system according to an embodiment of the present application.
Figure 2:
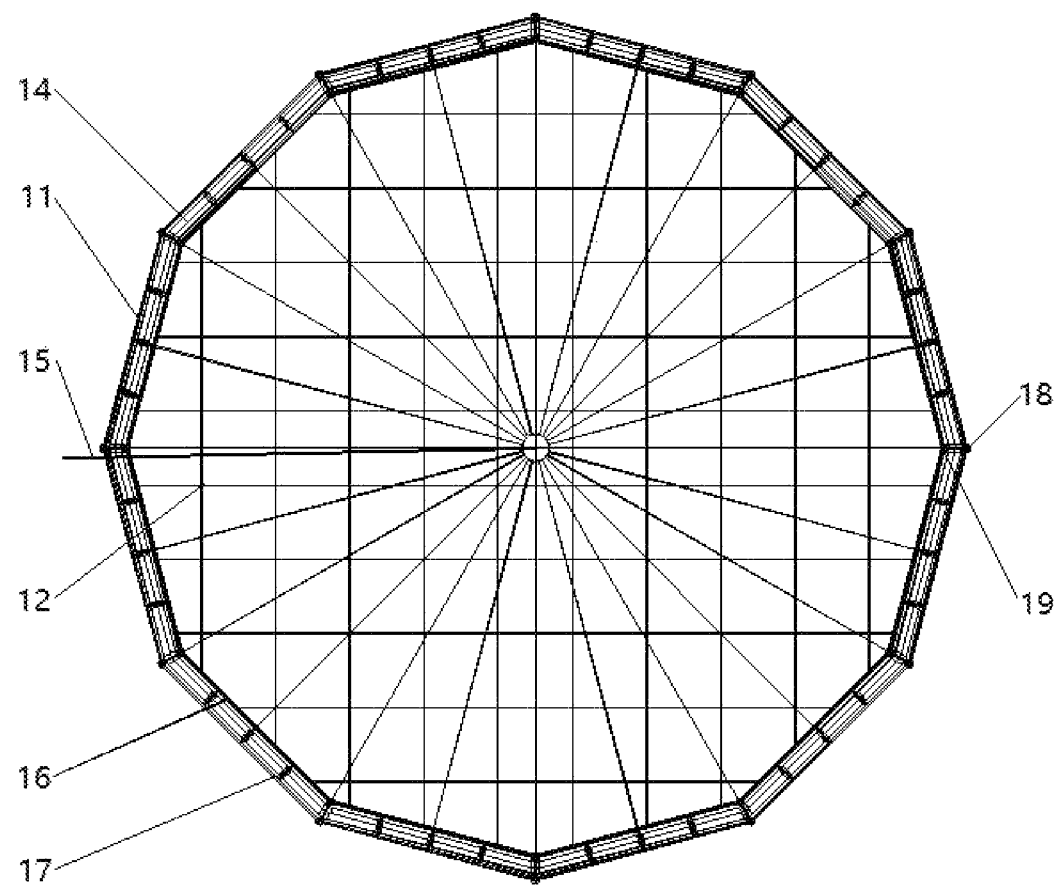
FIG. 2 is a top view of a steel structure cage for marine crustacean aquaculture according to an embodiment of the present application.

The following further describes exemplary embodiments of the present application in detail.

As shown in FIG. 1 to FIG. 7, a steel structure cage for marine crustacean aquaculture in an embodiment includes a steel frame 11, a top net system 12, a bottom net system 12, a side net system 13, a ballast tank system 14, and a feeding pipe 15. The steel frame 11 includes an internal steel frame and an external steel frame and the cross section of the steel frame 11 is a regular polygon. The top net system 12 and the bottom net system 12 are weaved by nylon or polyethylene nets and net tendons. Edges of the top net system 12 and the bottom net system 12 are fixed into the steel grooves 16, so that the top net system 12 and the bottom net system 12 are connected to the internal frame of the steel frame 11 in a seamless manner. The side net system 13 is a stainless steel net and is welded on the internal frame of the steel frame 11. That is, the bottom net system 12, the side net system 13 and the top net system 12 form an enclosed culturing space. Certainly, the term "enclosed" herein (the same below) means that cultured marine crustaceans cannot escape from this culturing space to the sea while seawater can freely flow in and out of this culturing space. The ballast tank system 14 is arranged between the internal steel frame and the external steel frame of the steel frame 11.

Figure 3:
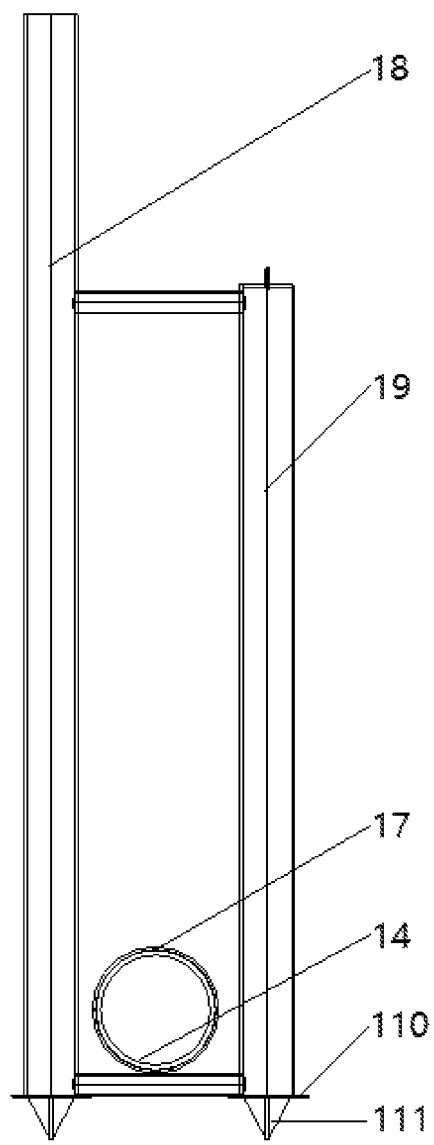
FIG. 3 is an arrangement diagram of a steel frame and a ballast tank system of a steel structure cage for marine crustacean aquaculture according to an embodiment of the present application.
Figure 4:
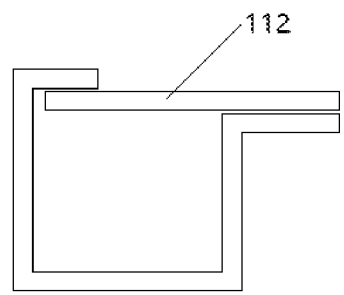
FIG. 4 is a schematic diagram of a specially customized stainless steel groove of a steel structure cage for marine crustacean aquaculture according to an embodiment of the present application.

In an embodiment, the steel frame 11 is a structure comprised of vertical steel pipes (columns), horizontal steel pipes, and inclined steel pipes. As shown in FIG. 3, a circular baffle 110 is welded at the bottom of each column of the internal and external steel frames of the steel frame 11, a conical structure 111 is welded on the circular baffle 110, and the circular baffle 110 has a diameter greater than the diameter of the column of the steel frame.

In an embodiment, the top net system 12 is fastened with floaters and the bottom net system 12 is fastened with heavy sinkers. The net tendons at the edges of the top net system 12 and the bottom net system 12 are secured in the stainless steel grooves 16. Movable cover plates 112 are used to connect the stainless steel grooves 16 to keep the net tendons in the stainless steel grooves 16. The stainless steel grooves 16 are welded on the horizontal steel pipes around the top and bottom of the internal frame of the steel frame 11.

In an embodiment, the ballast tank system 14 is formed by multiple HDPE pipes. The HDPE pipes do not communicate with each other and serve as independent cabins. The HDPE pipes of the ballast tank system 14 are fixed at the bottom of the steel frame 11 by hoops 17, and the HDPE pipes are located between the internal steel frame and the external steel frame.

In an embodiment, one end of the feeding pipe 15 is connected to a buoy and freely floats on the water surface, and the other end of the feeding pipe is placed inside the cage through the center of the top net system.

In an embodiment, the columns 18 of the external steel frame of the steel frame are higher than the columns 19 of the internal steel frame.

Figure 5:
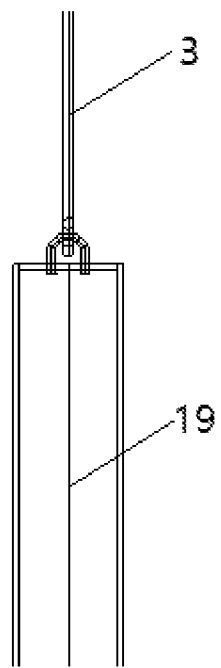
FIG. 5 is a connection diagram of a mooring line of a steel structure cage for marine crustacean aquaculture according to an embodiment of the present application.
Figure 6:
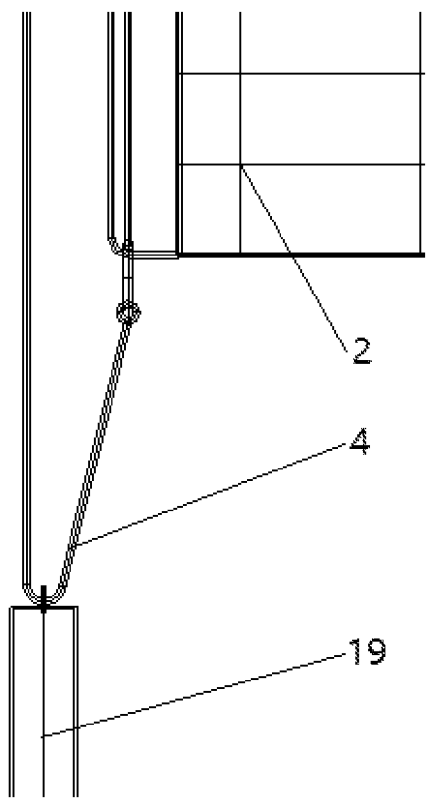
FIG. 6 is a connection diagram of a cable maintaining the shape of a net of a HDPE (circular) cage according to an embodiment of the present application.
Figure 7:
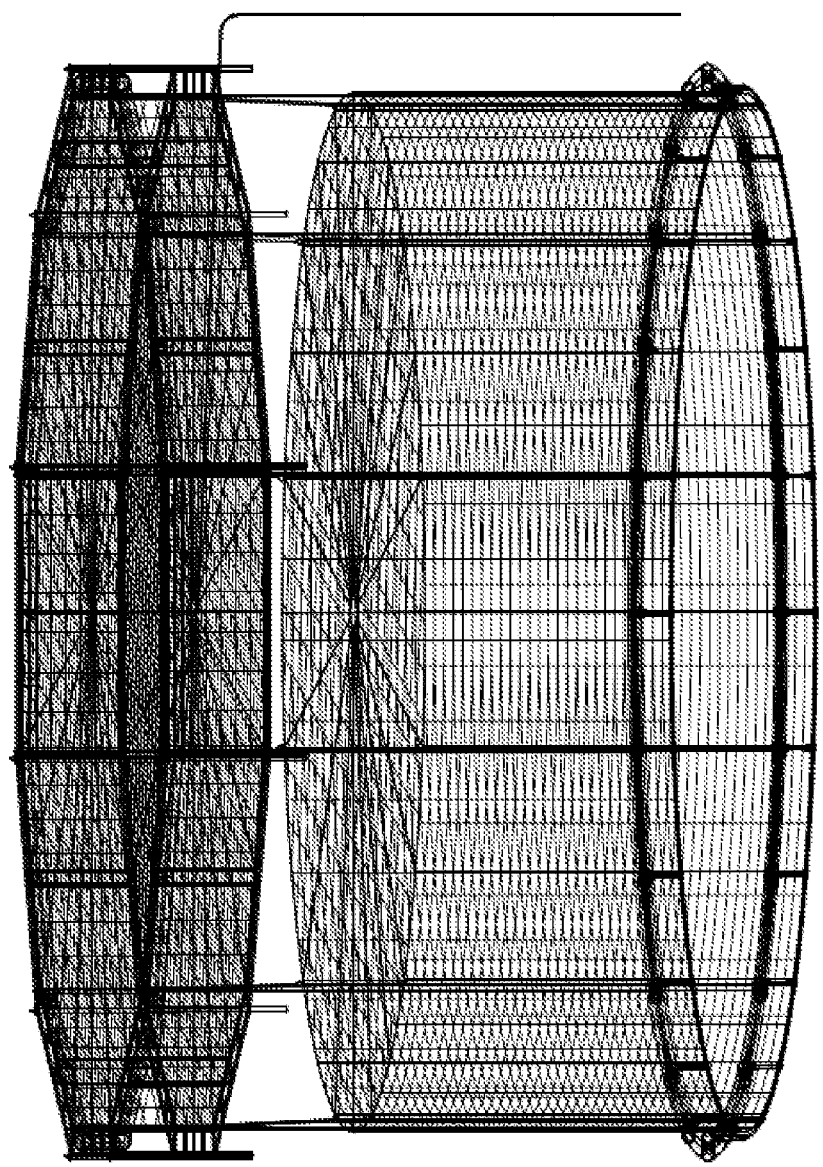
FIG. 7 is a three-dimensional diagram of a vertical fish-crustacean aquaculture system according to an embodiment of the present application.

As shown in FIG. 5 and FIG. 6, in an embodiment, the top of each column 19 of the internal frame is welded with a U-shaped steel lifting lug for the connection use of mooring lines 3 and cables 4.

As shown in FIG. 1, FIG. 5, FIG. 6, and FIG. 7, a vertical fish-crustacean aquaculture system in an embodiment includes a HDPE (circular) cage 2, mooring lines 3, cables 4, and the steel structure cage 1 for marine crustacean aquaculture described above. During culturing, the HDPE (circular) cage 2 floats on the water surface, and the steel structure cage 1 for marine crustacean aquaculture sits on seabed. The HDPE (circular) cage 2 is moored to the steel structure cage 1 for marine crustacean aquaculture by the mooring lines 3, and the net system of the HDPE (circular) cage 2 is connected to the steel structure cage 1 for marine crustacean aquaculture by the cables 4 to maintain the shape of the net system of the HDPE (circular) cage 2.

At the construction stage, the HDPE (circular) cage and the steel structure cage for marine crustacean aquaculture are first manufactured onshore. The construction of the HDPE (circular) cage can be easily fulfilled by present industrial technologies, or ordered from the current market. For the construction of the steel structure cage for marine crustacean aquaculture, the steel frame needs to be fabricated first. The number of sides of the regular polygon steel frame is the same as the number of sides of the steel structure cage for marine crustacean culturing. Each side of the regular polygon double-layered steel frame is welded in factory and then transported to the shore for assembly. When the fabrication of the steel frame is completed, the ballast tank system and the net systems are installed on the steel frame. After fabrication of the whole steel structure cage for marine crustacean aquaculture is completed, air is pumped into the ballast tank system. After the inflation is completed, first, the steel structure cage for marine crustacean aquaculture is lifted into water from the beach, and then the HDPE (circular) cage is lifted right above the steel structure cage for marine crustacean aquaculture, and next, the net system of the HDPE (circular) cage is connected to the U-shaped lifting lugs at the upper end of the columns of the internal steel frame of the steel structure cage for marine crustacean aquaculture with the cables, and floating collar of the HDPE (circular) cage is connected to the U-shaped lifting lugs with mooring lines. After these connections are done, the HDPE (circular) cage is placed on the steel frame of the steel structure cage for marine crustacean aquaculture (inside the external steel frame). The two cages are towed together by a tugboat. Because the center of gravity is very low, a good towing stability is ensured. When reaching the culturing site, the outlet valve of each air-duct is opened for the inside air to escape from the rubber capsules, and seawater enters the HDPE pipes. When the gravity of the steel structure cage for marine crustacean aquaculture is greater than its buoyancy, the steel structure cage for marine crustacean aquaculture gradually sinks to the seabed under the gravitational force, and the HDPE (circular) cage floats on the water surface due to the buoyancy force of the HDPE floating collar. In this way, the cables and the mooring lines are tightened, and the installation of the vertical fish-crustacean aquaculture system is completed.

During culturing operations, an automatic feeding system is used. The system includes an automatic feeding machine on a workboat. The feed is transferred from the workboat to the cages through pipes. One end of the feeding pipe of the steel structure cage for marine crustacean aquaculture is located in the cage, and the other end is connected to a buoy and freely floats on the water surface. For the HDPE (circular) cage, in order to spread feed evenly, a rotor spreader connected with a feeding pipe is adopted, and a small-size HDPE floating base which is located at the center of the HDPE (circular) cage and floats on the water surface is used to support the rotor spreader. When the feeding clock is on, a cage's feeding pipe is connected to the automatic feeding machine to activate feeding. In this case, the machine is multifunctional and costs are reduced.

The method of catching fish in the HDPE (circular) cage may use present technologies. For catching crustaceans in the steel structure cage for marine crustacean aquaculture, the mooring lines and the cables between the HDPE (circular) cage and the steel structure cage for marine crustacean aquaculture are disconnected first. Then air is pumped into the ballast tank system of the steel structure cage for marine crustacean aquaculture. When buoyancy of the steel structure cage is greater than its gravity, the steel structure cage gradually floats towards the water surface. The space between the internal and external steel frames at the top surface of the steel structure cage is the operation platform for fishermen. Catching can be performed by removing the movable cover plates from the specially customized stainless steel grooves and then removing the top net system.

The above contents are detailed descriptions of the present application in conjunction with specific preferred implementations, and it should not be considered that the specific implementations of the present application are limited to these descriptions. Those of ordinary skill in the art may also make some deductions or replacements without departing from the conception of the present application and all of such deductions or replacements should be considered to be within the scope of the protection as determined by the claims.

What is claimed is:

1. A steel structure cage for marine crustacean aquaculture comprising:
    a top net system, a bottom net system, a side net system, a ballast tank system, a steel frame, and steel grooves, wherein the steel frame comprises an internal steel frame and an external steel frame, and the steel grooves are fixed on upper and lower ends of the internal steel frame; the top net system and the bottom net system are weaved by nets and net tendons; edges of the top net system and the bottom net system are fixed into the corresponding steel grooves; the side net system is a steel net system and is welded on the internal steel frame; the ballast tank system is arranged between the internal steel frame and the external steel frame; and the bottom net system lies onto the seabed during culturing, and
    wherein both the internal steel frame and the external steel frame comprise columns, a baffle is welded on the bottom of each of the columns of the internal and external steel frames, a conical structure is welded on the baffle, and the area of the baffle is greater than the cross-sectional area of the column.

2. The steel structure cage for marine crustacean aquaculture according to claim 1, wherein the top net system is made of either nylon or polyethylene.

3. The steel structure cage for marine crustacean aquaculture according to claim 1, wherein the bottom net system is made of either nylon or polyethylene.

4. The steel structure cage for marine crustacean aquaculture according to claim 1, wherein both the internal steel frame and the external steel frame comprise columns, and the columns of the external steel frame are higher than those of the internal steel frame.

5. The steel structure cage for marine crustacean aquaculture according to claim 1, further comprising lifting lugs, wherein the lifting lugs are fixed on the top of the columns of the internal steel frame.

6. The steel structure cage for marine crustacean aquaculture according to claim 1, wherein the top net system is fastened with floaters and the bottom net system is fastened with heavy sinkers.

7. A vertical fish-crustacean aquaculture system, comprising a high density polyethylene (HDPE) cage, mooring lines, cables, and the steel structure cage for marine crustacean aquaculture according to claim 1, wherein during culturing, the HDPE cage floats on the water surface, the steel structure cage for marine crustacean aquaculture sits on the seabed, the HDPE cage is moored to the steel structure cage for marine crustacean aquaculture by the mooring lines, and a net system of the HDPE cage is connected to the steel structure cage for marine crustacean aquaculture by the cables to maintain the shape of the net system of the HDPE cage.

8. The vertical fish-crustacean aquaculture system according to claim 7, wherein both the internal steel frame and the external steel frame comprise columns, and the columns of the external steel frame are higher than those of the internal steel frame, so that during an offshore towing process, the steel structure cage for marine crustacean aquaculture can directly float on the water surface, and support the HDPE cage which is located inside the external steel frame.

9. A steel structure cage for marine crustacean aquaculture comprising:
    a top net system, a bottom net system, a side net system, a ballast tank system, a steel frame, steel grooves, and a feeding pipe,
    wherein the steel frame comprises an internal steel frame and an external steel frame, and the steel grooves are fixed on upper and lower ends of the internal steel frame; the top net system and the bottom net system are weaved by nets and net tendons; edges of the top net system and the bottom net system are fixed into the corresponding steel grooves; the side net system is a steel net system and is welded on the internal steel frame; the ballast tank system is arranged between the internal steel frame and the external steel frame; and the bottom net system lies onto the seabed during culturing, and
    wherein one end of the feeding pipe is connected to a buoy and freely floats on the water surface, and the other end of the feeding pipe is placed inside the cage through the center of the top net system.

* * * * *